Figure 1:
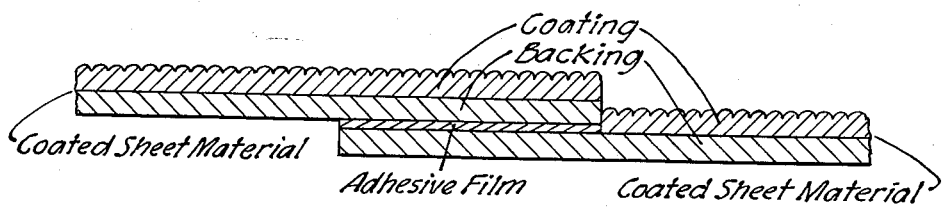

United States Patent Office 2,726,222
Patented Dec. 6, 1955

2,726,222

DRY FILM ADHESIVE FOR SPLICING FLEXIBLE SHEET MATERIAL

Philip V. Palmquist, New Canada Township, Ramsey County, and Jerome D. Grove, St. Paul, Minn., assignors to Minnesota Mining & Manufacturing Company, St. Paul, Minn., a corporation of Delaware Application November 19, 1949, Serial No. 128,294

4 Claims. (Cl. 260—25)

This invention relates to the splicing, or joining together at two abutting edges, of flexible sheet material. The invention provides a new type of heat-resistant splice having high tensile strength, a convenient and rapid method for the making of such a splice, and a novel temporarily thermoplastic splicing adhesive in dry film form for use in connection therewith.

The invention has particular utility in connection with the splicing together of adjacent sections of heavy coated flexible sheet material, e. g. reflux-reflective sheet material having a fabric or film backing and a heavy, dense surface coating of adherently bonded tiny glass sphericles, or other particulate-coated sheet material, during drying or heat-curing of the sheet in the form of suspended loops. The weight of the particulate-coated sheet makes a strong splice essential. The high temperature of the curing ovens requires that the splice be heat-resistant and non-thermoplastic.

Another requirement is that the splice must be easily and rapidly made. In the large-scale commercial oven curing of various types of treated or coated sheet materials, the curing operation is carried out while the material is suspended in the oven in long vertical loops. Successive strips are spliced together for ease in coating and suspending the material, and in order that the loops may later be economically taken down and wound up in roll form. Any break in the coating and racking operations results in loss of production and is to be avoided.

Adhesives in solution form, e. g. solutions of various resins in organic solvents, have previously been generally employed for splicing operations such as above described. Removal of solvent is necessary in order to obtain a strong bond, and the operation is therefore undesirably time-consuming. A further disadvantage is that in many cases the solvent causes softening or wrinkling of the sheet material to which the adhesive solution is applied.

The use of pre-formed films in the joining of various sheet materials has previously been suggested. Films of cellulose nitrate, dipped or briefly soaked in acetone, have been suggested as an improvement over cellulose nitrate solutions in joining fabrics. Phenolic resins supported on thin paper have replaced solution type adhesives in the making of certain varieties of plywood. But thermoplastic adhesives such as cellulose nitrate soften when heated, and such splices come apart in the curing ovens. Phenolic resins on heating slowly set up to a strong, but brittle and easily broken bond; splices made with these resins fail when the spliced area is pulled across rack sticks or jerked from the rack in the oven-curing of the spliced sheet material.

On the other hand, our novel dry film adhesive contains and requires no solvents or other ingredients which must later be removed and which might have an undesirable effect on the sheet material. It forms an effective adhesive bond when hot-pressed. The film rapidly heat-cures to a firm, tough, non-thermoplastic state when heated above a critical temperature. Splices made in heavy coated sheet material having a non-porous backing are extremely strong even at elevated temperatures, being capable of supporting the weight of several yards of the coated sheet when passing through an oven at temperatures up to at least about 200° F. No prior art adhesive known to us has been found capable of producing such results.

Figure 2:
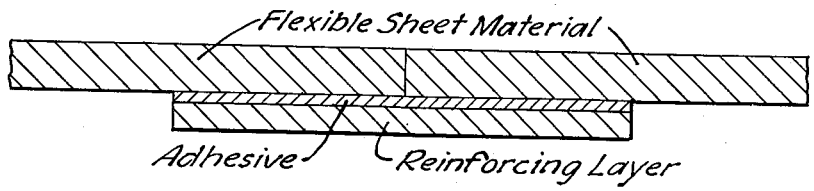
Figure 3:
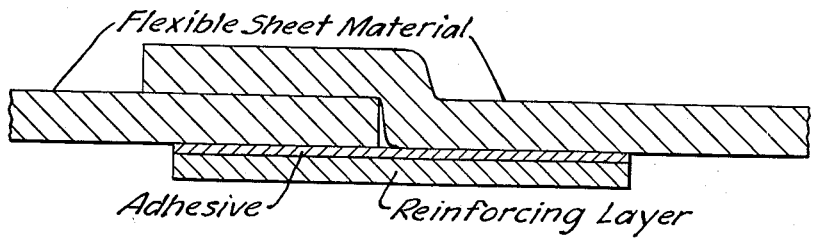

Three methods of forming splices between strips of flexible sheet material in accordance with the present invention are indicated in the accompanying drawing, in which Figure 1 represents a vertical cross-section of an overlap splice, Figure 2 represents a vertical cross-section of a butt splice, and Figure 3 is a variation of Figure 2.

The coated sheet material of Figure 1 consists of a backing member and a heavy coating applied to one side thereof, the coating having a rough outer surface comprised of particulate material. In order to make a strong overlap splice with such a sheet, it is necessary first to remove the coating from one of the areas to be spliced, e. g. by scraping or abrading. The coating may also be removed from the corresponding area of the other sheet, particularly where it is desired to produce a splice no thicker than the original unspliced sheet. For the same reason, where the backing is relatively thick, the edges of the backing may be skived or feather-edged before splicing. A section of our novel dry adhesive film, prepared in accordance with the example given hereinafter, is then placed between the two edge portions, as indicated in Figure 1, and the assembly placed briefly under heat and pressure to form a tough, strong, flexible, adherent and heat-resistant splice.

Figure 2 represents an alternative method of forming a splice, using our novel dry adhesive film. In this instance the pre-formed dried adhesive film is supported on a reinforcing layer of fabric or the like, and is pressed against the back surfaces of the two abutting sections of flexible sheet material which are to be spliced together. No preliminary scraping of either section is required, although in some cases it may be found desirable to abrade or roughen the otherwise glazed surface of the sheet material in order to provide best possible adhesion.

Where the splice is temporary only, and the spliced portion is later to be removed, it is sometimes more convenient to overlap the edge portions and to attach the adhesive-coated reinforcing layer to the back surface of both portions along the edge of the under-portion, as illustrated in Figure 3. Such a splice may be pulled across rack-sticks and around rollers in one direction without difficulty, even though when pulled in the other direction the overlapped upper portion may loosen and cause trouble. The splice is particularly effective as a means of rapidly yet effectively joining strips of sheet material temporarily, as for passage through an oven, where the spliced area is later to be discarded.

The following example gives in some detail the preparation of a typical splicing film suitable for the purposes of this invention.

*Example*

| | Parts |
|---|---|
| Butadiene-acrylonitrile rubbery polymer | 100 |
| Zinc oxide | 10 |
| Oil-soluble heat-advancing phenol-aldehyde resin | 50 |
| "Vinsol" ester gum | 50 |
| Salicylic acid ("Retarder W") | 15 |
| Acetone | 410 |
| 2,6-dibromomethyl-4-methylphenol | 3 |

The rubbery polymer was first softened on a rubber mill, and the zinc oxide incorporated. The resulting mill batch, together with the remaining ingredients, was dissolved (or finely dispersed) in the acetone, using a simple paddle type stirrer, to form a homogeneous blend. To this blend was then added the 2,6-dibromomethyl-4-methylphenol. The resulting fluid composition was coated in a thin uniform layer on a temporary carrier sheet, such as polyethylene-coated paper, and dried at room temperature. Before use, the dried film was stripped from the carrier sheet. It constituted an example of a self-supporting, normally stable and long-aging, temporarily thermoplastic and heat-activatible, rapidly heat-curing splicing film eminently suitable for making splices in accordance with this invention.

Cloth strips impregnated with phenolic resin and carrying a surface coating of dense, heavy inorganic particulate material bonded to the impregnated cloth with a phenolic resin binder were spliced together by first abrading the surface coating from about a ¾ inch width area along the adjoining edges, fitting a section of the adhesive splicing film of the above example over the thus exposed backing of the strip, lapping the reverse surface of the other prepared edge area over the film-covered prepared edge area, and pressing and heating the composite structure. A preliminary heating period of 10 seconds at 200 lbs. per sq. in., with the press platens at 355–385° F., warmed the assembly and softened the film. Pressure was then increased to 3000 lbs. per sq. in. for 15 seconds to complete the operation. The resulting splice was fully as strong as the original coated sheet material, both in tensile and in flexing tests and at elevated temperatures of the order of 200–250° F. as well as at room temperatures.

The preliminary removal of the surface coating from the edge portion of the sheet renders that portion susceptible of being adhesively bonded. While the adhesive film might adhere to the coating, the latter would in many instances form a weak link in the assembly and unless first removed would cause the splice to fail. With some types of coatings having sufficient strength and flexibility, suitable surface characteristics, and not too great thickness, and where uniform thickness across the splice area is not essential, this preliminary treatment of the edge area is unnecessary. For example, cloth webs lightly sized with ethyl cellulose may be spliced together with our novel adhesive film without any preliminary treatment, to form a strong, tough, flexible and non-thermoplastic joint or splice.

To a strong, tough, dense, untreated paper carrier web was applied in order a film-forming resin layer, a reflective layer, a resinous reactive binder layer, and a surface layer of glass sphericles, to produce a reflex-reflective sheet material on a removable paper carrier. Heat-curing of the resinous binder layer was facilitated by splicing together strips of this sheet material to form a continuous web for passage through a curing oven. The splices were assembled as shown in Figure 3 of the drawing, using a cloth reinforcing layer and a separate adhesive film layer, the latter being the dried film of the example given hereinbefore. The splice was completed by pressing the assembly with a hot flatiron and with considerable pressure for about one-half minute per yard of splice. The temperature of the film was thus raised at least to about 300° F.

In a further application, abutting and overlapping sections of a reflex-reflective spherical-surfaced flexible sheet material having an exposed aluminum foil backing were spliced together as in Figure 2 of the drawing, using the adhesive film of the example in conjunction with a coextensive area of fabric, and heating and pressing with a hot flatiron as just described. The film exhibited strong adhesion to the metal surface. Brief heating with the flatiron was sufficient to promote firm adhesive bonding and to cause curing of the film to a non-thermoplastic, highly heat-resistant state. The splice showed no signs of failure when stressed to the breaking point of the sheet material and at oven temperatures.

For greater convenience, the pre-formed film may preliminarily be lightly heat-bonded to the fabric or other reinforcing sheet, so that only one section of sheet material need be handled. An equivalent structure is more simply prepared by coating the adhesive solution of the example directly on cloth, paper, cellophane, metal foil, or other reinforcing sheet and drying at room temperature to a smooth surface. The resulting coated sheet possesses equally as good splicing characteristics as the combination of separate fabric and film where splices of the type illustrated in Figures 2 and 3 are concerned.

The self-supporting dried adhesive film of the example was about 3 mils thick, and in general we prefer to employ films within the range of about 2–8 mils thickness. Thinner films sometimes do not completely contact all surfaces of the areas to be spliced. Thicker films either undesirably increase the thickness of the splice or result in flowing of a portion of the composition beyond the edges of the spliced areas. Thickness of the film should be regulated to some extent in accordance with thickness of the material to be spliced, the thicker sheet material requiring thicker adhesive films. Thicker adhesive films, as well as sheet materials having thicker and heavier backings, frequently require somewhat longer periods of pre-heating than do thinner materials.

The particular rubbery polymer employed in the composition of the example was a copolymer of about 70 parts of butadiene and 30 parts of acrylonitrile. Other proportions may also be successfully employed. A considerable percentage of acrylonitrile or equivalent in making the polymer appears to be essential, but too high a proportion of acrylonitrile produces a stiff, boardy polymer which is hard to mill and to dissolve. In general, the range of 20–40 percent of acrylonitrile is preferred; within this approximate range, the polymers are rubbery and provide excellent properties in the adhesive film. Small amounts of other copolymerizable monomers may be polymerized with the butadiene and acrylonitrile, or may be substituted for a portion of a principal monomer; for example, isoprene may be incorporated.

Phenolic resins prepared by the alkali-catalyzed condensation of about 1.2–1.6 mols of an aldehyde such as formaldehyde with one mole of a substituted phenol such as a para-substituted alkyl or aryl phenol, e. g. para-tertiary-amyl phenol, have given excellent results in these compositions. This class of resins is well-known to the art as oil-soluble, heat-advancing or heat-reactive, 100% phenol-aldehyde resins, and is represented by many commercially available resins such as "Super-Beckacite #1003."

"Vinsol" ester gum is the glycerol ester of "Vinsol" resin, the gasoline insoluble aromatic hydrocarbon soluble resinous extract of pine wood. It represents a preferred neutral modifying resin for the blend of rubbery polymer and reactive phenolic resin. "Vinsol" ester gum, or othe requivalent hard, neutral, thermoplastic resin improves the heat-bonding properties of the film, and also improves the firmness of the bond or splice obtainable with the film. This relatively inexpensive resinous component also reduces the over-all raw materials cost of the film. "Vinsol" ester gum may be replaced for our purposes by acetone-soluble phenolic resins, such as "Durez 240" and "Varcum 5485."

Plasticizers, e. g. dibutyl phthalate, have been incorporated in limited amounts into these film-forming compositions where greater flexibility was desired.

Compounds such as 2,6-di-bromomethyl-4-methyl-phenol have been shown to act as vulcanizing agents for crude rubber, the reaction being due to the formation of a reactive methylene quinone on heating of the composition. The quinone then reacts with active hydrogen atoms of the rubber molecule to form an addition compound. The reaction is described in the thesis of S. Van Der Meer, originally published in Delft, 1943; see also Chemical Abstracts, volume 39, page 3961.

The Van Der Meer paper describes a large number of phenol-alcohols and their halogen derivatives which are decomposable to provide methylene quinone and are applicable to the vulcanization of rubber. While in general the compounds there described are found to have value in our film compositions, it has been found, contrary to the implications of the Van Der Meer thesis, that the halogenated materials are much superior to the hydroxy compounds for the purposes of our invention. Thus the phenol-alcohols, e. g. 2,6-di-hydroxymethyl-4-methyl-phenol, require extreme caution in their use in such films, since they tend to cause reduced stability of the dried film and to result in inferior adhesion to the backing of the flexible sheet material. Of the halogenated compounds, the chloro derivatives, e. g. 2,6-di-chloromethyl-4-methylphenol, appear unnecessarily reactive and tend to cause scorching of the film. When the brominated compounds, and particularly 2,6-di-bromomethyl-4-methylphenol, are employed as organic heat-curing agents, these adhesive film products are found to be readily manufactured, normally stable, and rapidly activated and vulcanized.

The specific compound 2,6-di-bromomethyl-4-methylphenol melts at 114–115° C. It has been found that vulcanization of the film products of this invention proceeds with extreme rapidity at temperatures above the melting point of the substituted phenol and particularly in the neighborhood of 300–375° C. Even though many commonly employed non-melting sheet materials such as paper, cloth, cellulosic or resinous films, etc. are rather rapidly deteriorated at temperatures of that order, the rapidity of vulcanization of our novel splicing film is such that the full strength of these sheet materials is maintained during the splicing operation.

Splices made as herein described with the films of this invention are strong, flexible and uniform, and retain their excellent properties under conditions of oven-curing. They make possible the handling of coated sheet material such as beaded fabric or film, as well as various other sheeted products, in the form of continuous strips during coating, curing, and forming into rolls. No splices nor splicing adhesives previously known to us have been fully effective for such application.

While we greatly prefer to employ film materials made in accordance with the specific formula and procedure of the example, we find that splices made with film materials of various modified formulas also show desirable improvement over prior art splices. Thus the proportions of the specific ingredients of the example, or of equivalent materials such as are hereinelsewhere noted, may be quite widely varied while still retaining the desired flexibility, adhesion, high strength, solvent resistance, absence of heat-softening, rapidity of cure, and other properties of the product.

Where in the claims the method of splicing is stated to include the step of assembling the sections of sheet material in reinforcing relationship, it will be understood that both the lapping of the sections upon each other (with an intercalated adhesive film having both surfaces available for adhesion to the said sections, as illustrated in Figure 1) and also the lapping of the sections over an external reinforcing member (with the intercalated adhesive film lying between the said reinforcing member and each of said sections, as in Figures 2 and 3) are to be included.

It will be apparent that we have invented a new and highly advantageous type of splice for joining sheet materials. While we have of necessity described our invention in terms of specific embodiments thereof, nevertheless we do not desire to be limited thereto, but rather we claim as coming within the scope of our invention such range of equivalents as the nature of the invention and the prior art permits.

What we claim is as follows:

1. A temporarily thermoplastic, rapidly heat-curing adhesive composition in dry film form, comprising a rubbery butadiene-acrylonitrile polymer, an oil-soluble heat-advancing phenol-aldehyde resin, and a monomeric methylene-quinone-liberating di-halomethyl alkyl phenol vulcanizing agent having the halomethyl groups ortho to the phenolic hydroxyl.

2. A temporarily thermoplastic, rapidly heat-curing adhesive composition in dry film form, comprising a rubbery butadiene-acrylonitrile polymer, an oil-soluble heat-advancing phenol-aldehyde resin, and 2,6-dibromomethyl-4-methylphenol.

3. A temporarily thermoplastic, rapidly heat-curing adhesive composition in dry film form, comprising the following ingredients in parts by weight approximately as set forth:

| | Parts |
|---|---|
| Butadiene-acrylonitrile rubbery polymer | 100 |
| Zinc oxide | 10 |
| Oil-soluble heat-advancing 100% phenol-aldehyde resin | 50 |
| Hard neutral thermoplastic resin | 50 |
| 2,6-dibromomethyl-4-methylphenol | 3 |

4. A temporarily thermoplastic, rapidly heat-curing, normally stable and long-aging adhesive article comprising a dry film of a composition comprising the following ingredients in parts by weight approximately as set forth:

| | Parts |
|---|---|
| Butadiene-acrylonitrile rubbery polymer | 100 |
| Zinc oxide | 10 |
| Oil-soluble heat-advancing 100% phenol-aldehyde resin | 50 |
| Glycerol ester of gasoline insoluble, aromatic hydrocarbon soluble, resinous extract of pine wood | 50 |
| Salicylic acid | 15 |
| 2,6-dibromomethyl-4-methylphenol | 3 |

References Cited in the file of this patent

UNITED STATES PATENTS

| 1,824,285 | Matson | Sept. 22, 1931 |
| 1,899,067 | Trumbull | Feb. 28, 1933 |
| 2,060,906 | Snyder | Nov. 17, 1936 |
| 2,367,725 | Lindh et al. | Jan. 23, 1945 |
| 2,401,987 | Taylor et al. | June 11, 1946 |
| 2,459,739 | Groten et al. | Jan. 18, 1949 |
| 2,491,477 | Chmiel | Dec. 20, 1949 |
| 2,504,295 | Beaver | Apr. 18, 1950 |
| 2,537,982 | Finn | Jan. 16, 1951 |

FOREIGN PATENTS

| 610,345 | Great Britain | Oct. 14, 1948 |

OTHER REFERENCES

Serial No. 357,662, Wildschut (A. P. C.), published April 20, 1943.

Van Der Meer: Pages 853, 856–859, Rubber Chem. and Tech. 18, 1945.